United States Patent

(12) United States Patent
Iwama

(10) Patent No.: US 7,362,532 B2
(45) Date of Patent: Apr. 22, 2008

(54) HARD DISK DEVICE HAVING NORMAL AND LOW DENSITY MEMORY REGIONS

(75) Inventor: Hideki Iwama, Yokohama (JP)

(73) Assignee: DENSO CORPORATION, Kariya (JP)

( * ) Notice: Subject to any disclaimer, the term of this patent is extended or adjusted under 35 U.S.C. 154(b) by 44 days.

(21) Appl. No.: 11/430,011

(22) Filed: May 9, 2006

(65) Prior Publication Data

US 2006/0285382 A1 Dec. 21, 2006

(30) Foreign Application Priority Data

Jun. 15, 2005 (JP) ............................. 2005-175008

(51) Int. Cl.
G11B 19/02 (2006.01)
G11B 5/02 (2006.01)
(52) U.S. Cl. ......................................... 360/69; 360/55
(58) Field of Classification Search ..................... None
See application file for complete search history.

(56) References Cited

U.S. PATENT DOCUMENTS

2002/0159354 A1 10/2002 Nakabayashi

2004/0223250 A1* 11/2004 Harata et al. ................. 360/69

FOREIGN PATENT DOCUMENTS

| JP | A-S58-147802 | 9/1983 |
| JP | A-2003-168259 | 6/2003 |
| JP | A-2003-257135 | 9/2003 |

* cited by examiner

Primary Examiner—Andrew L. Sniezek
(74) Attorney, Agent, or Firm—Posz Law Group, PLC

(57) ABSTRACT

A hard disk device includes a magnetic disk for storing data, a temperature sensor for detecting an ambient temperature and a controller for controlling operation of the hard disk device. The magnetic disk has a first memory region where data are memorized with a high density when the ambient temperature is higher than a predetermined temperature and a second memory region where data are memorized with a low density when the ambient temperature is lower than the predetermined temperature. The data stored in the second memory region can be transferred to the first memory region when the ambient temperature becomes higher than the predetermined temperature. It is assured that the data are successfully stored in the hard disk device at any temperature without much sacrificing the memory capacity.

9 Claims, 5 Drawing Sheets

HARD DISK DEVICE HAVING NORMAL AND LOW DENSITY MEMORY REGIONS

CROSS-REFERENCE TO RELATED APPLICATION

This application is based upon and claims benefit of priority of Japanese Patent Application No. 2005-175008 filed on Jun. 15, 2005, the content of which is incorporated herein by reference.

BACKGROUND OF THE INVENTION

1. Field of the Invention

The present invention relates to a hard disc device having a normal density memory region and a low density memory region.

2. Description of Related Art

Generally in a hard disc device, characteristics of a magnetic disk and a head deteriorate as ambient temperature becomes lower than a certain level. If this happens, data may not be successfully stored and the stored data may not be successfully read out. In the worst case, data may be destroyed. In order to avoid this problem, the following counter measures have been proposed. (1) Data storing operation is prohibited when the ambient temperature becomes lower than a predetermined level. (2) Data are read out immediately after the data are stored to check whether the data are successfully stored, and if some deficiencies are found, storing and reading-out are repeated until such operations succeed. (3) The magnetic disc having a low memory density is prepared for operation at a low temperature.

As to the counter measure (1), the hard disk cannot be used until the ambient temperature becomes higher than the predetermined level. As to (2), the storing operation may not succeed for a long period of time, and efficiency of the hard disk device may be greatly sacrificed. As to (3), a capacity of the hard disk is reduced although the storing operation is carried out at a low temperature.

JP-A-58-147802 proposes a magnetic disk that has a low memory density at its outer circumference to cope with expansion of the disk according to a temperature rise. This proposal, however, has nothing to do with above-mentioned problems at a low temperature.

SUMMARY OF THE INVENTION

The present invention has been made in view of the above-mentioned problems, and an object of the present invention is to provide an improved hard disk device, in which data are successfully stored and read out even when the ambient temperature is low without much sacrificing a memory capacity.

The hard disk device according to the present invention includes a magnetic disk for storing data, a temperature sensor for detecting an ambient temperature of the magnetic disk and a controller for controlling an entire operation of the hard disk device. A first memory region and a second memory region are provided in the magnetic disk. The data can be successfully stored in the first memory region with a normal density when the ambient temperature is higher than a predetermined temperature. When the ambient temperature is lower than the predetermined temperature, the data can be successfully stored in the second memory region with a memory density lower than in the first memory region.

The first memory region of the magnetic disk can be converted to the second memory based on a command by a user to store the data at a temperature lower than the predetermined temperature. The second memory region can be converted into the first memory region when the second memory region is not necessary. The data stored in the second memory region can be transferred to the first memory region when the temperature becomes higher than the predetermined temperature by converting physical addresses of the data set in the second memory region to the first memory region. The physical addresses, each corresponding to a logical address in one-to-one relation, are memorized in an address-converting table. The data stored in the second memory region can be easily transferred to the first memory region by changing the address-converting table.

The data-transfer from the second memory region to the first memory region may be carried out when the ambient temperature becomes higher than the predetermined temperature only if an access to the magnetic disk has not been done for a predetermined period of time and if such access is permitted by the controller. In this manner, the data-transfer can be done, utilizing vacancy time in which other operations are not being carried out.

According to the present invention, data can be surely stored in the hard disk device, irrespective of the ambient temperature, while minimizing reduction in the memory capacity. Other objects and features of the present invention will become more readily apparent from a better understanding of the preferred embodiment described below with reference to the following drawings.

DETAILED DESCRIPTION OF THE PREFERRED EMBODIMENT

Figure 4:
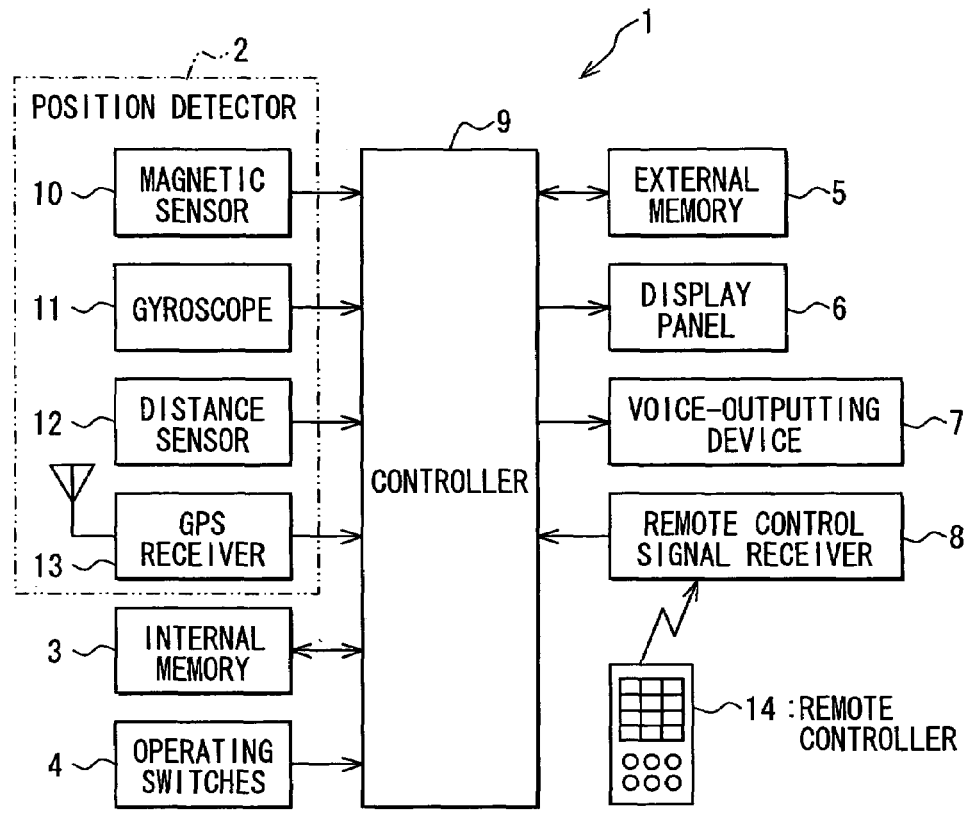
FIG. 4 is a block diagram showing a car navigation device to which the present invention is applied.

A preferred embodiment of the present invention will be described with reference to accompanying drawings. In this embodiment, the hard disk device according to the present invention is mounted on a car navigation system. First, referring to FIG. 4, an entire structure of the car navigation system 1 will be described. The car navigation system 1 includes a position detector 2, an internal memory 3 (a hard disk device of the present invention), operating switches 4, an external memory 5, a display panel 6, a voice outputting device 7, a remote control signal receiver 8, and a controller 9 connected to aforementioned components.

The controller is composed of a known computer including CPU, ROM, RAM, I/O and bus lines. A program for operating the controller 9 is stored in the ROM. The position detector 2 is composed of known components such as a magnetic sensor 10, a gyroscope 11, a distance sensor 12, and a GPS (Global Positioning System) receiver 13 for detecting a position of a vehicle based on signals sent from satellites. Since the magnetic sensor 10, the gyroscope 11, the distance sensor 12 and the GPS receiver 13 include respective detection errors, these components are used to compensate respective errors and to minimize a total detection error. Some of the components constituting the position detector 2 may be omitted, or other sensors such as a steering sensor of the vehicle and a vehicle speed sensor may be additionally used.

The hard disk device constituting the internal memory 3 stores various information and data, such as data for improving position accuracy (so-called map-matching data), map data and landmark data. The hard disk device will be described later in detail. The operating switch 4 may be constituted by mechanical switches and touch panel switches integrally formed with the display panel 6. Various commands from a user are inputted through the operating switches 4. The display panel 6 is constituted by a liquid crystal display panel, for example. A map read out from the internal memory 3 and a present position of the vehicle inputted from the position detector 2 are displayed on the display panel 6.

The voice-outputting device 7 includes a speaker and an audio amplifier. A speaker installed in a door of the vehicle may be used as the speaker of the voice-outputting device 7. The remote control signal receiver 8 receives signals sent from a remote controller 14 and feeds the received signals to the controller 9.

The car navigation system 1 described above has various functions including a map-display function, a route-calculation function (calculation of the most suitable driving route from a present position to a destination) and a route-guidance function (a driver is guided by voices and/or maps displayed on the display panel 6). The route-calculation may be performed based on a known Dykestra method. Further, the car navigation system 1 performs additional functions such as music-sound generating functions. The data stored in the external memory 6 can be transferred to the internal memory 3.

Figure 1:
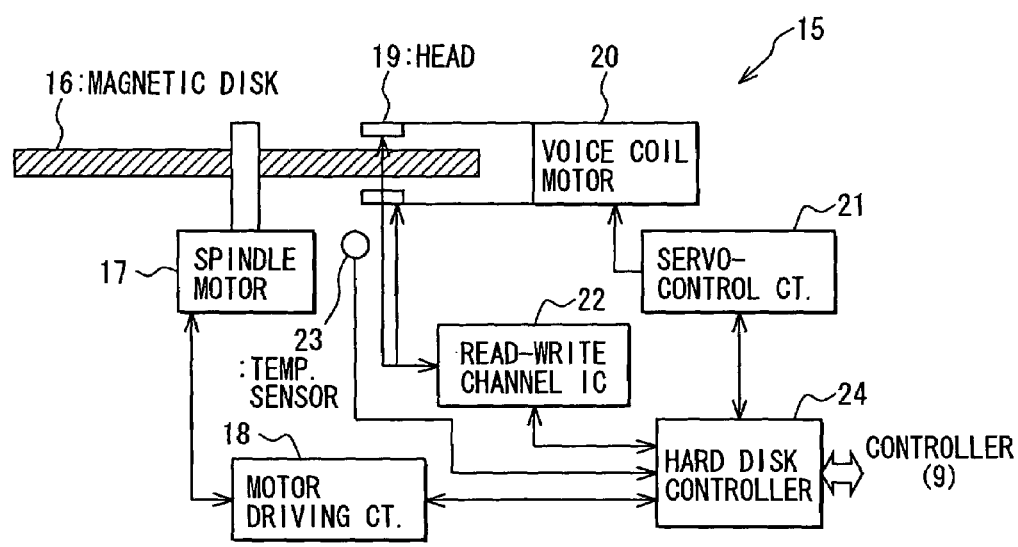
FIG. 1 is a block diagram showing en entire structure of a hard disk device according to the present invention.

Now, a structure of a hard disk device 15 will be described with reference to FIG. 1. The hard disk device 15 is mainly composed of: a magnetic disk 16 for storing data; a spindle motor 17 for rotating the magnetic disk at a predetermined speed; a motor-driving circuit 18 for controlling the spindle motor 17; a head 19, a voice coil motor 20 for properly positioning the head 19 on the magnetic disk 16; a servo-control circuit 21 for controlling the voice coil motor 20; a read-write channel IC 22 for modulating and demodulating signals/codes through the head 19; and a hard disk controller 24. The hard disk controller 24 controls the motor-driving circuit 18 and the servo-control circuit 21 according to commands fed from the controller 9 which functions as a host controller. The hard disk controller 24 also controls inputs and outputs of the codes to and from the read-write channel IC 22.

A temperature sensor 23 is positioned in the vicinity of the magnetic disk 16 to detect the ambient temperature. Data-storing to the magnetic disk 16 is controlled by the hard disk controller 24 according to the ambient temperature detected by the temperature sensor 23 in the manner described later in detail.

Figure 2:
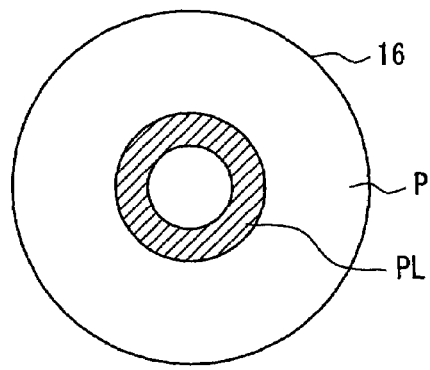
FIG. 2 is a plan view showing a magnetic disk having a first memory regions and a second memory region.
Figure 3:
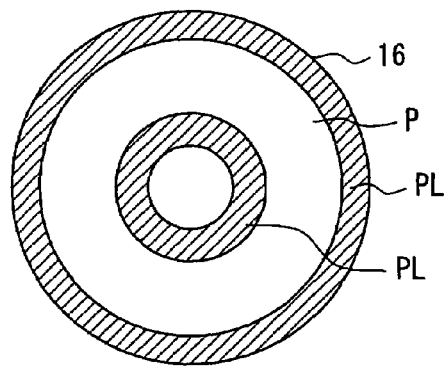
FIG. 3 is a plan view showing a magnetic disk having two second memory regions in addition to one first memory region.

As shown in FIG. 2, the magnetic disk 16 has a first memory region P in which data are stored in a normal density and a second memory region PL in which data are stored in a low density. In this particular example shown in FIG. 2, the second memory region PL is formed in the inner circumference of the magnetic disk 16, and the first memory region P is located outside the second memory region PL. The data can be successfully stored in the first memory region P when the ambient temperature is higher than a predetermined level, while data-storing in the second region PL are assured even when the ambient temperature is lower than the predetermined temperature. The predetermined temperature may be set to the lowest temperature at which data-storing in a normal density region such as the first memory region P is assured. The second memory region PL may be positioned at two places, at the innermost circumference and the outermost circumference, as shown in FIG. 3.

Figure 5:
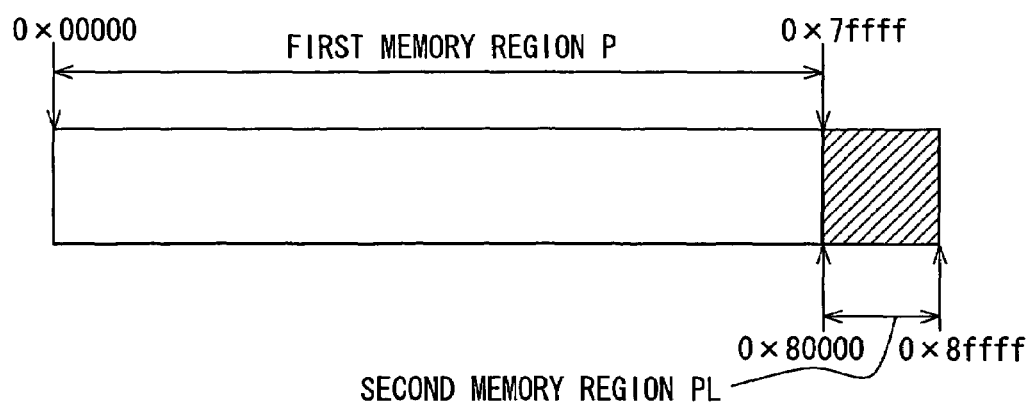
FIG. 5 is a schematic view showing physical addresses on a magnetic disk.

A command for data-storing and data-reading is given to the hard disk device 15 based on logical addresses in serial numbers. On the other hand, access to the magnetic disk 16 in the hard disk device 15 is performed based on physical address on the magnetic disk 16. An example of the physical address is shown in FIG. 5. In this example, the physical addresses from "0x00000" to "0x7ffff" are set in the first memory region P, and the physical addresses from "0x80000" to "0x8ffff" are set in the second memory region PL. A table, in which the logical addresses and the physical addresses corresponding to the logical addresses in one to one relation are listed, is referred to as an address-converting table. The address-converting table is administered in the hard disk device 15. It is preferable to store the address-converting table in the second memory region PL or in a non-volatile semiconductor memory because it has to be written and read without fail.

Figure 6:
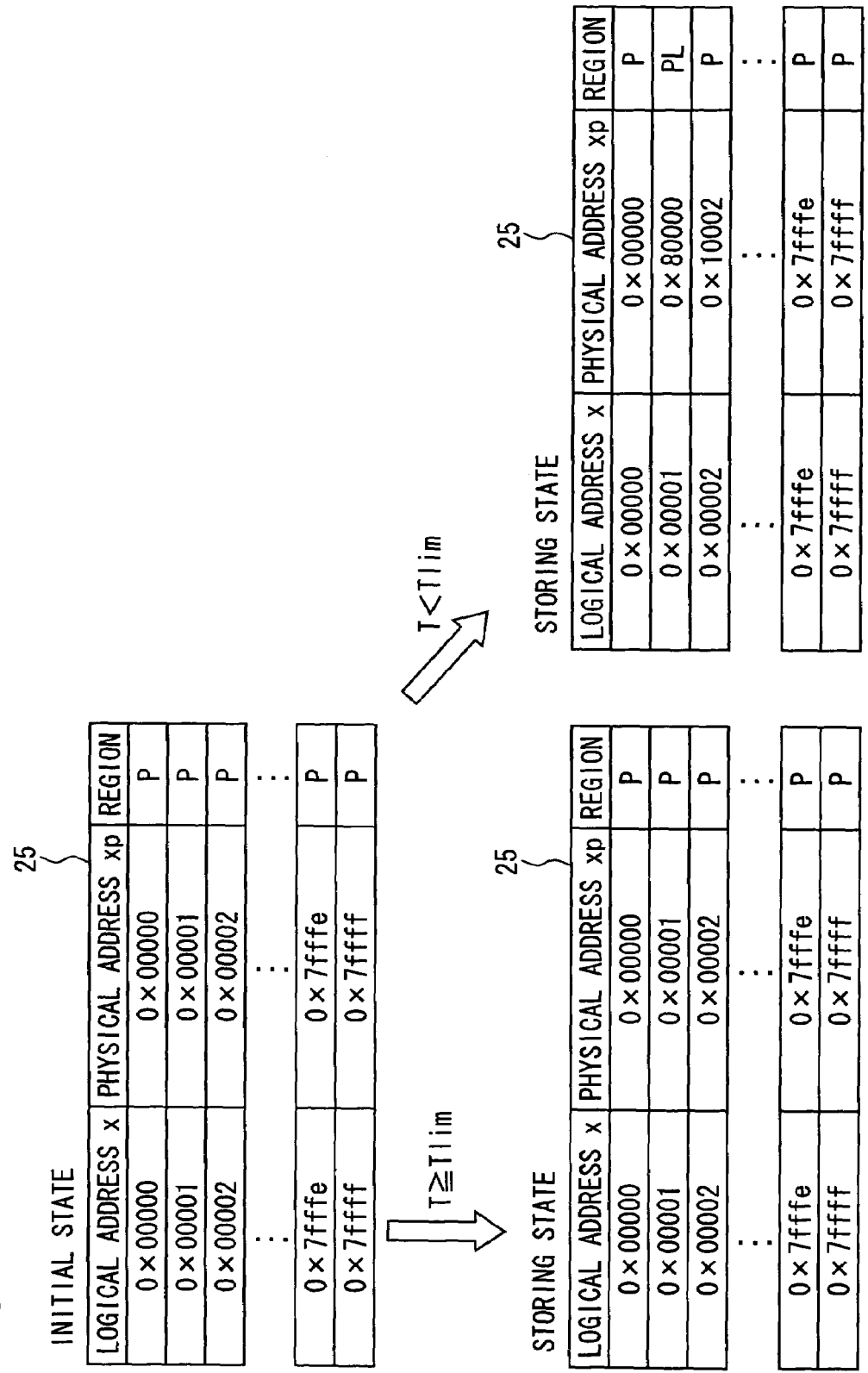
FIG. 6 is address-converting tables at an initial state, at a temperature higher than a predetermined level, and at a temperature lower than the predetermined level.

FIG. 6 shows an example of the address-converting table 25. An upper table shows the address-converting table at an initial state. In this initial state, all the physical addresses xp corresponding to respective logical addresses x are set in the first memory region P. In other words, an entire magnetic disk 16 is initially set as the first memory region P. When a command (such as an ATA-standard command or an SCSI-standard command according to types of the hard disk device 15) to change a part of the first memory region P to the second memory region PL is sent from the controller 9 to the hard disk device 15, the converting table 25 is rewritten to a bottom right table (FIG. 6) if the ambient temperature T is lower than a predetermined temperature Tlim. On the other hand, if the ambient temperature T is higher than the predetermined temperature Tlim, the converting table 25 is not rewritten (a bottom left table in FIG. 6). It is also possible to change again the second memory region PL to the first memory region P.

The command for changing the first memory region P to the second region PL designates a memory capacity to be changed and its physical position on the magnetic disk 16. When it is expected that the ambient temperature T decreases below the predetermined temperature Tlim, the user inputs the command for changing the memory regions. The hard disk device 15 performs the following actions: (1) rewrite the converting table and make a correct matching between the logical addresses x and the physical addresses xp; (2) decrease a track density (or a bit density, or the number of tracks) in the region to which the second memory region PL is allocated; and (3) select a memory region (P or PL) in which data are stored according to the ambient temperature T at a time of data-storing.

Figure 7:
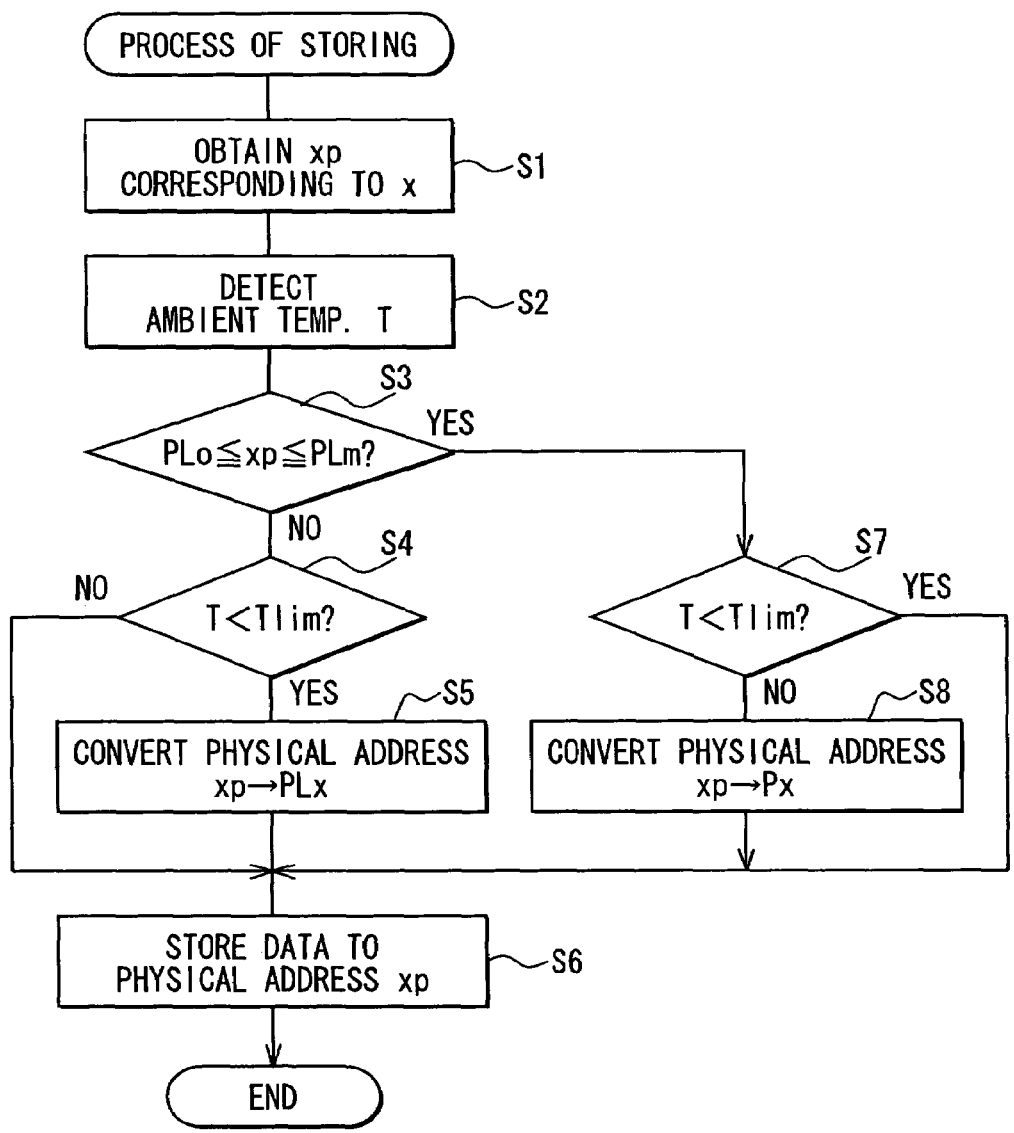
FIG. 7 is a flowchart showing a process of storing data in a magnetic disk.

With reference to FIG. 7, a process of data-storing will be described. The physical addresses xp located in the first memory region P are labeled as Pi (i=0-n), and the physical addresses located in the second memory region PL are labeled as PLj (j=0-m). At step S1, the physical address xp corresponding to the logical address x is obtained. At step S2, the ambient temperature T is detected by the temperature sensor 23 positioned close to the magnetic disk 16. At step S3, whether or not the physical address xp is located in the second memory region PL is determined.

If the physical address xp is located in the second memory region PL, the process proceeds to step S7, where it is determined whether the ambient temperature T is lower than the predetermined temperature Tlim. If the ambient temperature T is lower than the predetermined temperature Tlim, the process proceeds to step S6, where the data are stored in the physical address xp located in the second memory region PL, thereby assuring that the data are surely stored even if the temperature is low. If it is determined that the ambient temperature T is not lower than the predetermined temperature Tlim at step S7, the process proceeds to step S8, where the address-converting table 25 is rewritten to set the physical address xp in the first memory region P. Then, the process proceeds to step S6, where the data are stored in the physical address xp located in the first memory region P.

If it is determined that the physical address xp is not located in the second memory region PL at step S3, the process proceeds to step S4, where whether the ambient temperature T is lower than the predetermined temperature Tlim is determined. If the ambient temperature T is lower than the predetermined temperature Tlim, the process proceeds to step S5, where the address-converting table 25 is rewritten to set the physical address xp in the second memory region PL. Then, the process proceeds to step S6, where the data are stored in the physical address xp located in the second memory region PL. If it is determined that the ambient temperature T is not lower than the predetermined temperature Tlim at step S4, the process directly proceeds to step S6, where the data are stored in the physical address xp located in the first memory region P.

Referring to FIG. 6 again, an example of changing the address-converting table 25 will be explained. As mentioned above, the physical addresses xp each corresponding to a logical address x are all located in the first memory region P in the initial state, as shown in the upper table in FIG. 6. If the ambient temperature T is higher than the predetermined temperature Tlim at a time of data-storing, the address-converting table 25 remains unchanged, as shown in the lower left table in FIG. 6. If the ambient temperature T is lower than the predetermined temperature Tlim at a time of data-storing, the address converting table 25 is rewritten into a form shown in the lower right table in FIG. 6. In this example, the physical address "0x00001" located in the first memory region P is changed to the physical address "0x80000" located in the second memory region PL. As described above, positions for storing the data are selectively determined according to the ambient temperature T, and thereby a size of the low density memory region (PL) does not become unnecessarily large.

Figure 8:
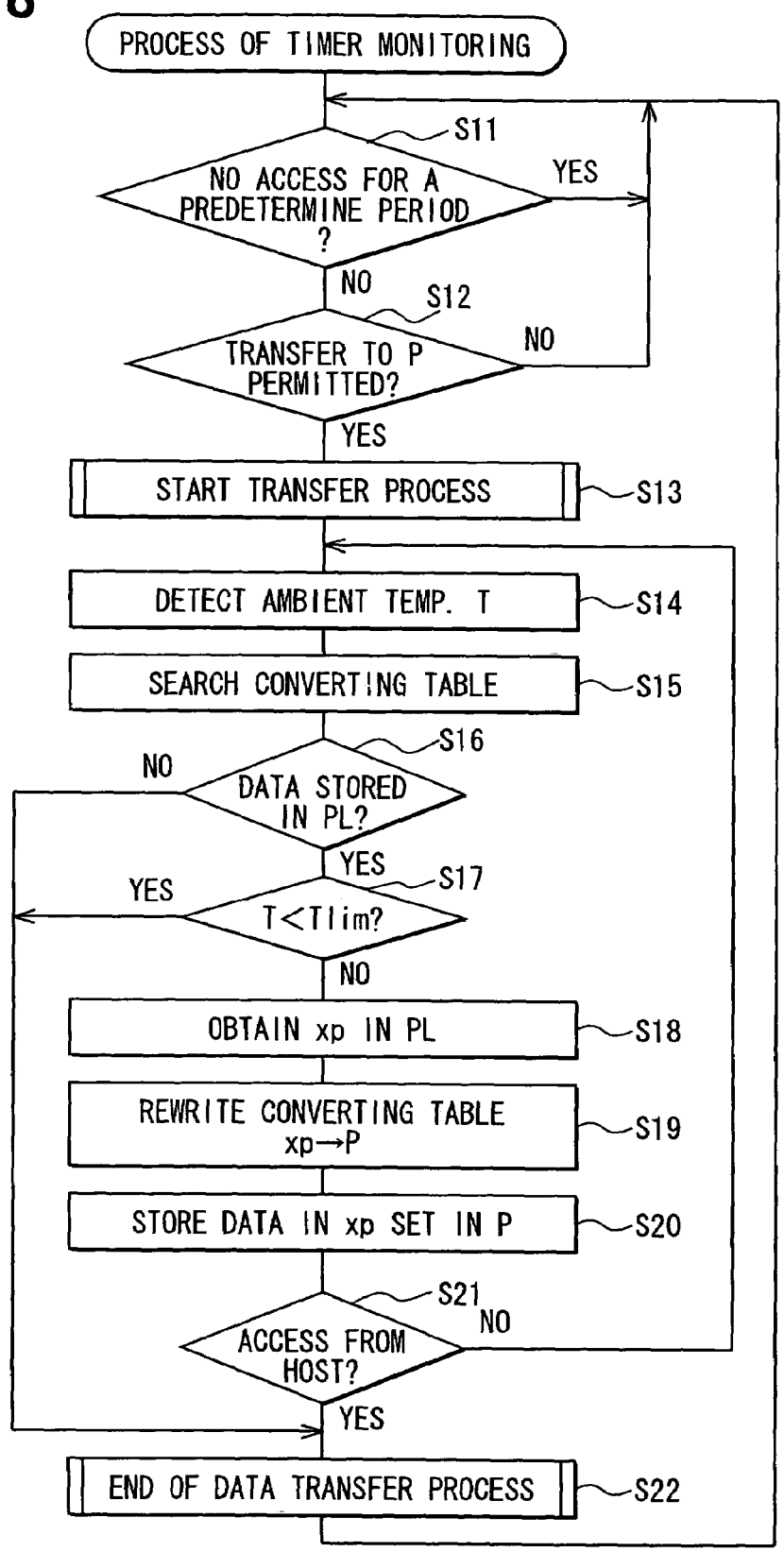
FIG. 8 is a flowchart showing a process of timer monitoring.

The hard disk controller 24 performs a process of timer monitoring shown in FIG. 8 in parallel with the storing process described above. As shown in FIG. 8, at step S11, whether an access to the hard disk device 15 has not been made for a predetermined period of time is checked. If no access has been made for a predetermined period of time, the process proceeds to step S12, where whether data transfer from the second memory region PL to the first memory region P is permitted by the host controller 9 is checked. If the data transfer is permitted, the process proceeds to step S13, where a process of transferring data to the first memory region P is initiated. If the access has been made within a predetermined period of time (S1), or if the data transfer is not permitted (S12), the process returns to S11.

The data transfer process includes the following steps. At step S14, the ambient temperature T is detected. At step S15, data stored in the magnetic disk 16 are searched. At step S16, whether data have been stored in the second memory region PL is checked. If data have been stored in the second memory region PL, the process proceeds to step S17, where whether the ambient temperature T is lower than the predetermined temperature Tlim is determined. If no data have been stored in the second memory region PL (S16), the process proceeds to step S22, where the process comes to the end. If the ambient temperature T is lower than the predetermined temperature Tlim, it is judged that the data transfer to the first memory region P is not possible, and the process proceeds to step S22, where the data transfer process comes to the end.

If the ambient temperature T is not lower than the predetermined temperature Tlim (S17), it is judged that the data transfer to the first memory region P is possible, and the process proceeds to step S18, where the physical addresses xp in the second memory region PL are obtained. Then, at step S19, the data-converting table 25 is rewritten so that the physical addresses xp are located in the first memory region P. At step S20, the data are stored in the physical addresses xp in the first memory region P. At step S21, whether an access from the host controller 9 has been made is determined. If the access has been made, the process proceeds to step S22, where the data transfer process comes to the end. If the access has not been made, the process returns to step S14 to repeat the process. The data stored in the second memory region PL can be transferred to the first memory region P in the manner described above.

Advantages attained in the present invention will be summarized as bellow. The first memory region P where data can be stored with a higher density when the ambient temperature T is higher than a predetermined temperature Tlim and the second memory region PL where data are stored with a lower density when the ambient temperature T is lower than the predetermined temperature Tlim are provided in the magnetic disk 16. Therefore, the data can be successfully stored in the hard disk device 15 regardless of the ambient temperature T. The data transfer between two memory regions P, PL is made by rewriting the data-converting table 25. Therefore, the data transfer can be easily made.

Data stored in the second memory region PL can be transferred to the first memory region P when the ambient temperature becomes higher than the predetermined temperature Tlim. Therefore, it is avoided that a capacity of the second memory region PL having a lower memory density becomes unnecessary large. Further, two memory regions can be arbitrarily converted to each other. In the case where there is no chance that the ambient temperature T becomes lower than the predetermined temperature Tlim, the second memory region PL needs not be set, or the second memory region PL already set can be converted to the first memory region P. In this manner, the capacity of the first memory region P can be properly maintained.

The present invention is not limited to the embodiment described above, but it may be variously modified. For example, The present invention may be applied to the hard disk device for use in various devices such as a personal computer or a digital recorder. The predetermined temperature Tlim may be set to a temperature at which data can be successfully stored in the first memory region P. Such a temperature may be referred to as an assurance temperature. A temperature of the magnetic disk may be directly detected in place of the ambient temperature T. It is also possible to provide plural second memory regions having varying memory densities and to selectively use those memory regions according to the ambient temperature.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A hard disk device comprising:
a magnetic disk having a first memory region and a second memory region, data being stored in the second memory region with a lower density than in the first memory region,
a temperature sensor for detecting ambient temperature of the magnetic disk;
a controller that controls the hard disk device so that data are stored in the first memory region when the ambient temperature is higher than a predetermined temperature and in the second memory region when the ambient temperature is lower than the predetermined temperature; and
means for forming the second memory region on part of the magnetic disk based on a command.

2. The hard disk device as in claim 1, wherein:
the second memory region is formed on part of the magnetic disk by reducing a track density or a bit density, or both, from those in the first memory region.

3. The hard disk device as in claim 1, wherein:
the controller includes means for transferring the data stored in the second memory region to the first memory region when the ambient temperature becomes higher than the predetermined temperature.

4. The hard disk device as in claim 3, further including an address-converting table, in which physical addresses of the magnetic disk memorized in one-to-one correspondence to logical addresses are able to be dynamically converted between the first memory region and the second memory region, wherein the data stored in the second memory region are transferred to the first memory region by changing the physical addresses of the data when the ambient temperature becomes higher than the predetermined temperature.

5. The hard disk device as in claim 4, wherein:
the controller converts the physical addresses, each corresponding to a logical address, set in the second memory region to the first memory region upon initiating data-storing when the ambient temperature becomes higher than the predetermined temperature.

6. The hard disk device as in claim 4, wherein:
the controller converts the physical addresses, each corresponding to a logical address, set in the second memory region to the first memory region upon initiating data-storing when the ambient temperature becomes higher than the predetermined temperature if an access to the magnetic disk is permitted by the controller.

7. The hard disk device as in claim 6, wherein:
the controller converts the physical addresses only when no access to the magnetic disk has been made for a predetermined period of time.

8. The hard disk device as in claim 1, wherein the command is a user input command and indicates to change memory regions.

9. The hard disk device as in claim 8, where in the command further designates a memory capacity of the first memory region and the second memory region to be changed.

* * * * *